United States Patent
Cooper et al.

(10) Patent No.: US 11,735,939 B2
(45) Date of Patent: *Aug. 22, 2023

(54) RECHARGEABLE BATTERY KIOSK THAT DYNAMICALLY ALTERS A CHARGING RATE OF RECHARGEABLE BATTERIES BASED ON USAGE DATA

(71) Applicant: Neutron Holdings, Inc., San Francisco, CA (US)

(72) Inventors: Ashley Cooper, San Francisco, CA (US); Paul Durkee, San Francisco, CA (US); Celina Mikolajczak, San Francisco, CA (US)

(73) Assignee: Neutron Holdings, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/750,677

(22) Filed: May 23, 2022

(65) Prior Publication Data

US 2022/0360092 A1    Nov. 10, 2022

Related U.S. Application Data

(63) Continuation of application No. 16/705,011, filed on Dec. 5, 2019, now Pat. No. 11,374,421.

(Continued)

(51) Int. Cl.
*H02J 7/00* (2006.01)
*B60L 53/62* (2019.01)
(Continued)

(52) U.S. Cl.
CPC .............. *H02J 7/007* (2013.01); *B60L 53/62* (2019.02); *B60L 53/80* (2019.02); *B60L 58/16* (2019.02); *H02J 7/005* (2020.01)

(58) Field of Classification Search
CPC ........ H02J 7/007; H02J 7/005; H02J 7/00047; H02J 7/0013; H02J 7/0048; H02J 2310/48; H02J 7/00036; H02J 7/0071; H02J 13/00032; B60L 53/62; B60L 53/80; B60L 58/16; B60L 53/66; B60L 3/12; B60L 58/12; B60L 2200/12; B60L 2260/50; B60L 58/18; B60L 53/53; B60L 2200/24;
(Continued)

(56) References Cited

U.S. PATENT DOCUMENTS

2011/0121790 A1 *  5/2011  Brandon, II .......... H01M 10/44
                                                              320/160
2012/0200256 A1    8/2012  Tse
(Continued)

FOREIGN PATENT DOCUMENTS

EP     3 386 061 A1    10/2018
JP     2017225342 A    12/2017
(Continued)

*Primary Examiner* — Nha T Nguyen
(74) *Attorney, Agent, or Firm* — Dentons US LLP

(57) ABSTRACT

A rechargeable battery kiosk can dynamically alter a charging rate of one or more rechargeable batteries housed within the rechargeable battery kiosk to increase a probability that the rechargeable battery kiosk has an ample supply of fully charged, or mostly fully charged, rechargeable batteries based on an anticipated usage data for the rechargeable battery kiosk.

16 Claims, 7 Drawing Sheets

Related U.S. Application Data

(60) Provisional application No. 62/775,813, filed on Dec. 5, 2018.

(51) Int. Cl.
*B60L 58/16* (2019.01)
*B60L 53/80* (2019.01)

(58) Field of Classification Search
CPC .............. G06Q 10/06; B60Y 2200/126; B60Y 2200/13; B60Y 2200/91
See application file for complete search history.

(56) References Cited

U.S. PATENT DOCUMENTS

| | | |
|---|---|---|
| 2013/0006677 A1 | 1/2013 | Anglin et al. |
| 2015/0336465 A1 | 11/2015 | Luke et al. |
| 2016/0071079 A1 | 3/2016 | Aloe |
| 2016/0099590 A1 | 4/2016 | Velderman et al. |
| 2018/0253788 A1 | 9/2018 | Takatsuka et al. |
| 2019/0202416 A1* | 7/2019 | Lai ...................... B60L 53/305 |

FOREIGN PATENT DOCUMENTS

| | | |
|---|---|---|
| WO | 2013173195 A1 | 11/2013 |
| WO | 2018104965 A1 | 6/2018 |

* cited by examiner

RECHARGEABLE BATTERY KIOSK THAT DYNAMICALLY ALTERS A CHARGING RATE OF RECHARGEABLE BATTERIES BASED ON USAGE DATA

CROSS-REFERENCE TO RELATED APPLICATIONS

This application is a continuation of U.S. patent application Ser. No. 16/705,011 filed on Dec. 5, 2019, now allowed, which claims the priority of Provisional U.S. Application No. 62/775,813 filed Dec. 5, 2018.

BACKGROUND

Electric vehicles (e.g., scooters, bicycles, etc.) are typically powered by a power source such as, for example, a rechargeable battery. In some cases, the rechargeable battery may be removably coupled to an electric vehicle. When the rechargeable battery coupled to the electric vehicle has little or no remaining power, an individual may swap that rechargeable battery with another rechargeable battery (e.g., one that has more power or has been fully charged). In some cases, the swapping of rechargeable batteries may occur at a particular location that stores and/or charges rechargeable batteries.

SUMMARY

Disclosed herein is a rechargeable battery kiosk (e.g., a device that includes a processing unit, charging circuitry, and communication capabilities that automates the receipt and distribution of one or more rechargeable batteries) that houses and charges rechargeable batteries for light electric vehicles (e.g., scooters, bicycles, etc.). As will be described herein, the rechargeable battery kiosk (also referred to herein as a "battery kiosk") houses a number of rechargeable batteries that are in the process of being charged or are fully charged. Each of the rechargeable batteries in the battery kiosk may be swapped for other rechargeable batteries with little or no remaining power. However, to help ensure or increase the probability that the battery kiosk has an ample supply of fully charged (or substantially fully charged) rechargeable batteries, examples described herein provide a battery kiosk that dynamically alters a charging rate of one or more rechargeable batteries housed within the battery kiosk. As used herein, the term substantially may be defined as 70% or more, 80% or more, or 90% or more. Thus, a rechargeable battery that is substantially fully charged or substantially charged may be charged to approximately 70% or more of its charging capacity.

The present disclosure also describes a method for determining anticipated usage data for a rechargeable battery kiosk. According to some examples, the method includes determining or receiving, at a rechargeable battery kiosk (e.g., from a remote system over one or more networks), anticipated usage data for the rechargeable battery kiosk for a given duration of time. In some examples, the anticipated usage data is based, at least in part, on one or more of: historical usage data of rechargeable batteries at the rechargeable battery kiosk; current rechargeable battery usage information in an area associated with the rechargeable battery kiosk; or requests for one or more of a plurality of rechargeable batteries housed in the rechargeable battery kiosk. In response to determining or receiving the anticipated usage data, the rechargeable battery kiosk selects at least one rechargeable battery from the plurality of rechargeable batteries. Once the at least one rechargeable battery has been selected, the rechargeable battery kiosk charges the selected rechargeable battery at a first charging rate while charging at least one of the plurality of rechargeable batteries at a second charging rate that is different from the first charging rate.

A rechargeable battery kiosk is also described. According to examples, the rechargeable battery kiosk comprises one or more processors and one or more memory resources. The one or more memory resources are coupled to the one or more processors and store instructions that, when executed by the one or more processors, cause the rechargeable battery kiosk to perform operations. These operations may include receiving a request for a rechargeable battery exchange. In response to the request, the rechargeable battery kiosk may receive, in a first battery bay, a first rechargeable battery. The rechargeable battery kiosk may also receive anticipated usage data for the rechargeable battery kiosk. In some examples, the anticipated usage data is based, at least in part, on one or more of historical usage data of rechargeable batteries at the rechargeable battery kiosk, current rechargeable battery usage information in an area associated with the rechargeable battery kiosk, or requests for one or more of a plurality of rechargeable batteries housed in the rechargeable battery kiosk. In response to receiving the anticipated usage data, the rechargeable battery kiosk may charge the first rechargeable battery at a first charging rate while charging at least one of the plurality of rechargeable batteries at a second charging rate that is different from the first charging rate. The rechargeable battery kiosk may also release a second rechargeable battery from a second battery bay.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
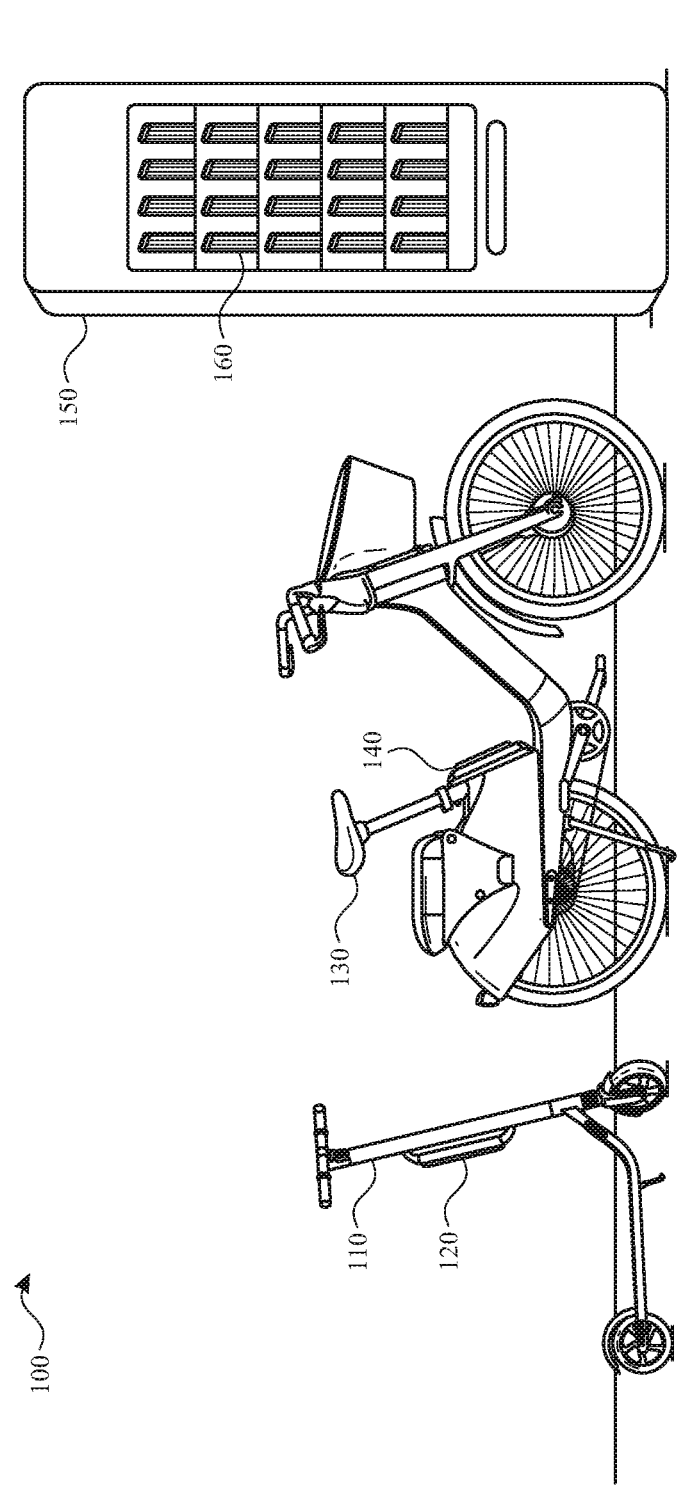
FIG. 1 illustrates an example environment in which a rechargeable battery kiosk receives and distributes rechargeable batteries for different kinds of light electric vehicles according to one or more examples.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes a rechargeable battery kiosk that houses and charges rechargeable batteries for light electric vehicles (e.g., scooters, bicycles, etc.). The rechargeable battery kiosk (also referred to herein as a battery kiosk) houses a number of rechargeable batteries. Each of the rechargeable batteries may have a different level of charge. For example, some of the rechargeable batteries may be in the process of being charged by the rechargeable battery kiosk while other rechargeable batteries may be fully charged. Each of the rechargeable batteries in the rechargeable battery kiosk may be swapped with other rechargeable batteries with little or no remaining power.

For example, as an individual uses a light electric vehicle, power stored by the rechargeable battery of the light electric vehicle may be consumed and, if not recharged, eventually depleted. Once the battery power is depleted (or at a time before this occurs), the individual may use a rechargeable battery kiosk to exchange the rechargeable battery for another rechargeable battery. For example, the individual may swap the depleted rechargeable battery with one that is fully charged or mostly fully charged. However, to help ensure or increase the probability that the rechargeable battery kiosk has an ample supply of fully charged (or substantially fully charged) rechargeable batteries for one or more users to swap out in a given duration of time, examples described herein provide a rechargeable battery kiosk that selects and dynamically alters a charging rate of one or more rechargeable batteries housed within the rechargeable battery kiosk.

For example, the rechargeable battery kiosk can determine, or receive from a network service, anticipated usage data for the rechargeable batteries housed in the rechargeable battery kiosk. That is, the network service and/or the rechargeable battery kiosk can predict, anticipate or otherwise determine a demand for rechargeable batteries, over various periods of time. In some examples, the anticipated usage data for the rechargeable batteries is based, at least in part, on a number of different data sets or other such information. In some examples, this information includes, but is not limited to, historical usage data (e.g., historical demand) for rechargeable batteries at the rechargeable battery kiosk, current rechargeable battery usage information in an area associated with the rechargeable battery kiosk (e.g., during a specified duration of time), and/or information corresponding to requests for rechargeable batteries that are received by the rechargeable battery kiosk (e.g., during a specified duration of time).

When the anticipated usage data for the rechargeable battery kiosk is determined or received, the rechargeable battery kiosk may determine whether it can meet the demand specified by the anticipated usage data using its current charging profile. As used herein, a charging profile is information about a charging rate of each rechargeable battery in the rechargeable battery kiosk. In the examples described herein, a rechargeable battery kiosk may have or otherwise be associated with a number of different charging profiles.

For example, the rechargeable battery kiosk may charge one rechargeable battery at a first charging rate, may charge a second rechargeable battery at a second charging rate that is different from the first charging rate and may charge the remaining rechargeable batteries at a third charging rate. In another charging profile, the rechargeable battery kiosk may charge one rechargeable battery at a first charging rate, may charge a second rechargeable battery at a second charging rate that is different from the first charging rate while not charging any of the other rechargeable batteries in the rechargeable battery kiosk. Although specific examples have been given, a rechargeable battery kiosk may have many different charging profiles. Additionally a charging profile may be updated or changed based on information received or determined by the rechargeable battery kiosk. For example, a charging profile may change in response to a user returning a rechargeable battery to the rechargeable battery kiosk.

As used herein, a charging rate refers to an amount of current that is supplied to a particular rechargeable battery over a given duration of time. As more current is supplied to the rechargeable battery, the rechargeable battery will charge at faster rate.

If the rechargeable battery kiosk determines that it cannot meet the demand specified by the anticipated usage data using its current charging profile, the rechargeable battery kiosk may adjust the charging rate of one or more of the rechargeable batteries. For example, depending on various implementations, a rechargeable battery kiosk may house nine rechargeable batteries. Without the anticipated usage data, the rechargeable battery kiosk may charge each of the rechargeable batteries at the same rate. However, based on the anticipated usage data (and/or other information such as a charge amount of each of the rechargeable batteries housed in the rechargeable battery kiosk), the rechargeable battery kiosk may adjust its charging profile such that more current is applied to one or more of the rechargeable batteries to increase the charging rate of those rechargeable batteries (when compared to a charging rate of one or more of the other batteries in the battery kiosk). As an addition or an alternative, the rechargeable battery kiosk can also reduce the amount of current applied to one or more of the other batteries based on the anticipated usage data. As a result, when an individual user arrives at the rechargeable battery kiosk to exchange his or her rechargeable battery with another rechargeable battery, a fully charged (or substantially fully charged) rechargeable battery will be available.

FIG. 1 illustrates an example environment 100 in which aspects of the present disclosure may be practiced. As illustrated, environment 100 includes an electric scooter(s) 110, an electric bicycle(s) 130, and a rechargeable battery kiosk(s) 150. It will be appreciated that the electric scooter 110 and the electric bicycle 130 are provided as example light electric vehicles and that, in other examples, aspects described herein apply to other types of light electric vehicles.

As described herein, the environment 100 includes a network service that receives information from the electric scooter 110 and/or the electric bicycle 130 (also referred to herein as light electric vehicles) over a network communication channel (e.g., one or more networks, the Internet, etc.). The information enables a user, using a client application executing on a computing device, to locate, request, and/or reserve (e.g., rent or borrow for a duration of time) one or more light electric vehicles.

In some examples, the network service includes one or more computing systems or servers that are remote from the computing device of the user and the light electric vehicles. The one or more computing systems includes an application programming interface (API) that enables the one or more computing systems to receive information from, send information to, and otherwise interact with the computing device, the light electric vehicles 110, 130 and/or the rechargeable battery kiosk(s) 150.

For example, the client application executing on the computing device of the user receives, from the network service over the network communication channel, information about a location of one or more of the light electric vehicles. The location of each of the light electric vehicles can then be provided on a user interface of the client application.

In one example, the user interface of the client application includes a map that displays a determined location of the user and/or a determined location of the light electric vehicles. In some examples, the determined location of the user and/or the determined location of the light electric vehicles is based, at least in part, on Global Positioning System (GPS) data (or other location information) received by the network service over the network communication channel.

The user interface of the client application displays the location information of the user and the light electric vehicles as different icons (or other such representations). Once the location information is displayed, the user may select an icon representing a type of light electric vehicle (e.g., an icon for an electric scooter 110 or an icon for an electric bicycle 130). The user interface of the client application then generates or determines a route (e.g., provides directions) from the user's current location to the selected light electric vehicle. Selection of one of the icons may also enable the user to reserve (e.g., place a hold on) the light electric vehicle (to ensure that the light electric vehicle will be at the determined location when the user arrives), rent the light electric vehicle and/or borrow the light electric vehicle for a period of time.

Each light electric vehicle and/or the network service also includes a location tracking system that tracks, receives and/or determines a location of each light electric vehicle as they are used. In some examples, the location tracking system tracks the location information of the light electric vehicle in real-time or substantially real-time. In other examples, the location tracking system determines the location information of the light electric vehicle at periodic intervals (e.g., every minute, every 5 minutes, every 10 minutes, etc.). In yet other examples, the location tracking system may track the location of the light electric vehicle in real-time or substantially real-time when the light electric vehicle is rented or otherwise used by a user and may track location information at periodic intervals when the light electric vehicle has been reserved or is otherwise not is use.

The one or more computing systems of the network service also include one or more databases that store information about each of the light electric vehicles and/or the rechargeable battery kiosk(s) 150. For example, the one or more databases may store location information for each light electric vehicle and/or the rechargeable battery kiosk(s) 150, rechargeable battery status information for rechargeable batteries used by each light electric vehicle and/or in the rechargeable battery kiosk(s) 150, rechargeable battery kiosk information (e.g., the number of rechargeable batteries housed by the rechargeable battery kiosk 150), and/or light electric vehicle status information (e.g., how many times the light electric vehicle has been used, whether the light electric vehicle is damaged, whether the light electric vehicle should be serviced etc.).

The one or more databases may also store information about the user. This information may include a profile of the user (e.g., username, contact information, etc.) security credentials of the user (e.g., a password), historical usage data, payment information and the like.

The one or more computing systems of the network service may also include a matching system. The matching system receives, manages or otherwise handles various requests from the user. The requests may include light electric vehicle rental requests and light electric vehicle reservation requests. For example, when a vehicle rental request is received from the client application executing on the user's computing device, the matching system may communicate with the location tracking system and determine which light electric vehicle should be matched with or otherwise assigned to the requesting user.

The one or more computing systems of the network service may also include a payment system that processes payment information of the user. For example, when a user rents and uses a light electric vehicle, the user may be charged for the usage based on a duration of use and/or a travel distance. Once the user has finished using the light electric vehicle (e.g., by arriving at their intended destination, a check-in point, a battery kiosk 150, etc.), the payment system may automatically process the payment information of the user.

As discussed above, the environment 100 includes one or more light electric vehicles including, but not limited to, an electric scooter 110 and an electric bicycle 130. In examples, the electric scooter 110 includes vehicle components (e.g., wheels, axles, baseboard, handlebar, braking mechanisms, etc.), one or more electric motors, control systems, sensors, speakers, and/or lights, which may be powered by a rechargeable battery. The rechargeable battery may be secured to the electric scooter 110 by a battery holster 120.

Likewise, and in some examples, the electric bicycle 130 includes vehicle components (e.g., wheels, axles, chains, gears, bicycle seat, handlebar, bicycle frame, braking mechanisms, etc.), one or more electric motors, control systems, sensors, speakers, and/or lights, which may also be powered by a rechargeable battery. The rechargeable battery may be secured to the electric bicycle 130 by a battery holster 140.

The control system of the electric scooter 110 and/or the electric bicycle 130 manages the power output to the one or motors, provides a visual indication as to a charge level of the rechargeable battery in the battery holster 120, and/or communicates directly (e.g., via Wi-Fi, Bluetooth, etc.) or indirectly (e.g., via one or more remote computing devices, one or more networks, the Internet, etc.) with the computing device of the user and/or with the network service.

Example communications include, but are not limited to, initiating locking or unlocking of the electric scooter 110 or the electric bicycle 130 (e.g., initiating or ending a travel session), initiating a battery swap to exchange a rechargeable battery in the battery holster 120 or the battery holster 140 with one in a rechargeable battery kiosk 150, determining a location and/or status information of the electric scooter 110 or the electric bicycle 130, and determining a location of a rechargeable battery and/or a rechargeable battery kiosk 150. Lights, speakers, and/or other output devices of the electric scooter 110 or the electric bicycle 130 may be used to provide an indication as to the location of the electric scooter 110 or the electric bicycle 130 or as an anti-theft mechanism, among other examples.

As shown in FIG. 1, each light electric vehicle includes a battery holster. For example, the battery holster 140 is affixed to the seat tube of the electric bicycle 130, while the battery holster 120 is illustrated as being affixed to the handlebar column of the electric scooter 110. It will be appreciated that the locations of the battery holsters 120 and 140 are provided as examples, and that a battery holster may be positioned in a variety of alternate locations in other examples. For example, the battery holster 140 may be affixed to the handlebar column or the cross bar of the electric bicycle 130. As another example, the battery holster 120 may be affixed to the deck or located near the rear of the electric scooter 110.

The battery holsters 120 and 140 are each operable to receive a rechargeable battery. For example, an individual user may operate a light electric vehicle for a period of time and then determine that the rechargeable battery in use by the light electric vehicle needs to be recharged. In some instances, the light electric vehicle, or the rechargeable battery itself, may communicate current battery charge information for the rechargeable battery to the computing device of the user. In another example, the rechargeable battery and/or battery holster 120 and 140 may include a visual indicator to display the charge level of the rechargeable battery. As an addition or an alternative, the electrical vehicle, or the rechargeable battery itself, may communicate current battery charge information for the rechargeable battery to the network service, which can provide battery information to the computing device of the user. When this occurs, the user may be directed to a rechargeable battery kiosk 150. For example, the network service can transmit data, over one or more networks, to the computing device to cause the computing device to display information about a particular rechargeable battery kiosk 150 to travel to.

When the user arrives at the rechargeable battery kiosk 150, the user may exchange the light electric vehicle's current battery with another rechargeable battery housed by the rechargeable battery kiosk 150, thereby enabling the light electric vehicle to continue or resume operation. In some instances, the user can use the client application executing on the computing device of the user to locate and/or select a rechargeable battery kiosk 150, receive directions to the rechargeable battery kiosk 150, and initiate a battery swap with the rechargeable battery kiosk 150 when the user arrives at its location.

According to examples, when a battery swap is initiated, the control system of the light electric vehicle may enable the rechargeable battery 160 to be removed from a battery holster, such as battery holster 120 or 140. The rechargeable battery 160 may then be exchanged for a different rechargeable battery 160 housed by the rechargeable battery kiosk 150. The rechargeable battery 160 may subsequently be inserted into the battery holster of the light electric vehicle.

The rechargeable battery kiosk 150 stores and charges a set of rechargeable batteries 160. Each rechargeable battery 160 in the set can be used by both the electric scooter 110 and the electric bicycle 130. In some examples, multiple rechargeable battery kiosks 150 are located within a city, county, or other geographic region. For example, one rechargeable battery kiosk may be located in or otherwise associated with a first geographic area within a geographic region and another rechargeable battery kiosk may be located in or otherwise associated with a second geographic area within the geographic region.

Thus, when a user is traveling through the geographic region on an light electric vehicle and wants or needs to exchange the light electric vehicle's current rechargeable battery for one that has more charge, the user may be directed (e.g., via the client application executing on the user's computing device) to the rechargeable battery kiosk 150 associated with the geographic region. When the user arrives at the rechargeable battery kiosk 150, the user can exchange their current rechargeable battery for one that is fully charged or substantially fully charged. This enables the user to travel using a light electric vehicle across distances that may otherwise not be possible using the power provided by one charge of a rechargeable battery.

In some examples, the rechargeable battery kiosk 150 comprises a control system that communicates directly or indirectly with a computing device of the user when performing a battery swap such as described above. In examples, the control system communicates with a remote computing device(s), e.g., that implements the network service, using a connection to one or more networks, such as a Wi-Fi network and/or a cellular network. The rechargeable battery kiosk 150 may receive and/or report rechargeable battery status information to a remote computing device(s). The rechargeable battery status information can include, but is not limited to, rechargeable battery charge levels, rechargeable battery state of health (including an amount of charge the cells of the rechargeable battery can hold, an efficiency of the rechargeable battery, how quickly the rechargeable battery can be charged, how quickly the charge in the rechargeable battery is consumed, etc.), an amount of rechargeable batteries currently available at the rechargeable battery kiosk, and/or usage demand statistics.

Figure 2:
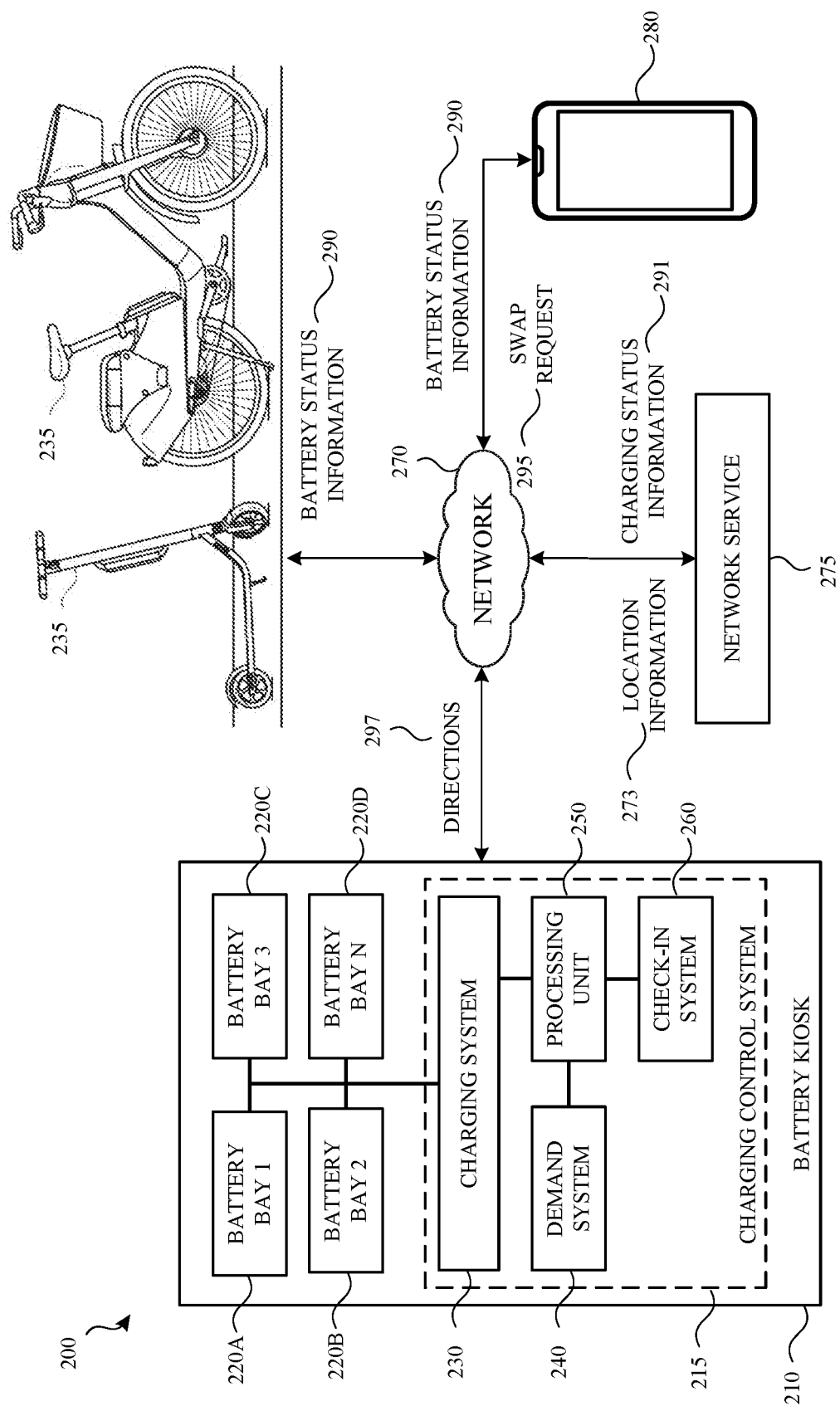
FIG. 2 is a system diagram of rechargeable battery kiosk that may dynamically alter a charging rate of one or more rechargeable batteries based on anticipated usage data according to one or more examples.

FIG. 2 illustrates a battery charging system 200 according to an example. In some examples, the battery charging system 200 includes a battery kiosk 210. The battery kiosk 210 uses a charging control system 215 to dynamically alter a charging rate of one or more rechargeable batteries based, at least in part, on anticipated usage data received and/or determined by the battery kiosk 210. In some examples, the battery kiosk 210 may be equivalent to the rechargeable battery kiosk 150 shown and described with respect to FIG. 1.

The battery kiosk 210 includes one or more battery bays (e.g., battery bay 1 220A, battery bay 2 220B, battery bay 3 220C and battery bay N 220D). Although four battery bays are shown, the battery kiosk 210 can include any number of battery bays. Each of the battery bays receives, stores, and distributes or releases rechargeable batteries (e.g., rechargeable battery 160 (FIG. 1)) for various light electric vehicles 235. For example, a user of a light electric vehicle 235 in a particular geographic area may be directed to a battery kiosk 210 located in or otherwise associated with the geographic area when it is determined that the user wishes, needs or should exchange the current rechargeable battery of the light electric vehicle 235 for a fully charged or substantially fully charged rechargeable battery.

For example, as the user is driving or riding the light electric vehicle 235, an application executing on the user's computing device (e.g., computing device 280) may receive an indication from the light electric vehicle 235 and/or the rechargeable battery that power in the rechargeable battery is getting low or is below a charge threshold (e.g., the battery has 20% charge available). In another implementation, the light electric vehicle 235 may include one or more lights, displays or other such indicators that provide or otherwise display the amount of charge remaining in the rechargeable battery. In yet another implementation, the rechargeable battery may include the indicators described above in order to display or otherwise communicate to the user the amount of charge remaining in the rechargeable battery.

Once this information has been provided to the user, in one example, the user may wish to exchange the current rechargeable battery for one that is fully charged or substantially fully charged. Accordingly, the user can be directed to a battery kiosk 210. For example, the application executing on the computing device 280 may communicate location information 273 to a network service 275 over a network 270. The network service 275 can use the location information 273, as well as location information associated with the battery kiosk 210, to direct (e.g., provide directions 297) the user to the nearest battery kiosk 210 (based on the current location of the user and/or current location of the light electric vehicle 235) or to another battery kiosk 210 that is capable of receiving, storing, and charging a rechargeable battery. Although the example above explains that the user is directed to a particular battery kiosk 210 when it is determined that the remaining power in the rechargeable battery is low or is below a threshold, the user may simply decide to exchange the current rechargeable battery of the light electric vehicle 235 for one that is more fully charged—regardless of the amount of power remaining in the rechargeable battery. In such cases, the user may be directed to, or may find, a battery kiosk 210 in order to exchange rechargeable batteries.

In some examples, the battery kiosk 210 stores a number of rechargeable batteries equal to the number of battery bays in the battery kiosk 210. In other examples, the battery kiosk 210 houses fewer rechargeable batteries than the number battery bays. For example, if the battery kiosk 210 includes nine battery bays, eight of the battery bays may have a rechargeable battery while one of the battery bays remains empty. Thus, when a user initiates a battery exchange, the user can insert their old/depleted rechargeable battery into the open battery bay and remove another rechargeable battery from a different battery bay.

For example, once the user reaches the location of the battery kiosk 210, the user may remove the rechargeable battery from the light electric vehicle, place the rechargeable battery in an empty battery bay (e.g., battery bay 1 220A), and remove a charged rechargeable battery from a different battery bay (e.g., battery bay 2 220B). As described above, an application executing on a computing device, such as for example, computing device 280, may direct the user to a particular battery kiosk 210.

As also shown in FIG. 2, the battery kiosk 210 includes a charging control system 215. The charging control system 215 includes a charging system 230, a demand system 240, a processing unit 250 and a check-in system 260. Although the charging system 203, the demand system 240, the processing unit 250 and the check-in system 260 are shown as being integrated with the charging control system 215, each of these systems may be stand-alone systems while still operating such as described herein.

The check-in system 260 is designed to determine a current status of the received rechargeable battery and enable the battery kiosk 210 to provide the user with a fully charged or substantially fully charged rechargeable battery in exchange. In some examples, the current status of the received rechargeable battery includes information about an amount of charge remaining in the rechargeable battery, the number of times the rechargeable battery has been charged (i.e., the number of charging cycles), the overall health of battery cells within the rechargeable battery (e.g., also referred to as a state of health that may indicate an amount of charge the cells of the rechargeable battery can hold, an efficiency of the rechargeable battery, how quickly the rechargeable battery can be charged, how quickly the charge in the rechargeable battery is consumed, etc.) and/or other identifying characteristics about the rechargeable battery (e.g., a unique identifier associated with the rechargeable battery). The rechargeable battery may then be inserted into or otherwise received by an open battery bay.

Once the rechargeable battery has been inserted into the open battery bay, a user may select and remove a different rechargeable battery from the battery kiosk 210. In some cases, the battery kiosk 210 will release a different rechargeable battery once the rechargeable battery has been inserted into the open battery bay. Once the old rechargeable battery has been inserted into the battery bay, a charging system 230 of the battery kiosk 210 may begin charging the rechargeable battery based on a charging profile.

In some examples and as briefly explained above, the battery kiosk 210 can dynamically alter a charging rate of each rechargeable battery. This helps ensure or increases a probability that the battery kiosk 210 has an ample supply of fully charged (or substantially fully charged) rechargeable batteries when a user wants to exchange their rechargeable battery at the battery kiosk 210.

The battery kiosk 210 may dynamically alter the charging rate for one or more rechargeable batteries based, at least in part, on anticipated usage data of the battery kiosk 210 over a given period of time. In some examples, the battery kiosk 210 includes a demand system 240. The demand system 240 receives (e.g., from the network service 275), determines, and/or stores (e.g., in a memory resource or device) anticipated usage data of the battery kiosk 210. The anticipated usage data may include or be based, at least in part on, historical usage data of rechargeable batteries at the battery kiosk 210, current rechargeable battery usage information in an area associated with the battery kiosk 210, and/or received requests for one or more of the rechargeable batteries housed in the battery kiosk 210.

Historical usage data of rechargeable batteries at the battery kiosk 210 may include information about how many times, during a particular time block or time period within a given day, rechargeable batteries are exchanged (e.g., swapped) at the particular battery kiosk 210. In some examples, the amount of time in a time block may be equally divided throughout the day. For example, each day may be divided into two hour time blocks, four hour time blocks, six hour time blocks and so on.

In other examples, each day is broken down or divided into different time blocks. For example, a given day can be divided into six hour time blocks between 12:00 AM and 6:00 AM, divided into one hour time blocks between 6:00 AM and 10:00 AM and between 4:00 PM and 8:00 PM, divided into two hour time blocks between 10:00 AM and 4:00 PM, and divided into four hour time blocks between 8:00 PM and 12:00 AM. Although specific examples are given, a particular day may be divided into various different time blocks.

In some examples, the demand system 240 (or alternatively, a demand system of the network service 275 in other examples) divides the particular day into various time blocks based on a location of the battery kiosk 210 and/or on peak demand characteristics. For example, the demand system 240 for a battery kiosk 210 located on 2nd Street and Market Street in San Francisco may determine, based on historical usage data and/or current light electric vehicle use information, that users swap (or will swap) more rechargeable batteries at this particular battery kiosk between 6:00 AM and 8:00 PM than they do between 8:00 PM and 6:00 AM. As such, the demand system 240 may divide a particular day into two hour time blocks from 12:00 AM to 6:00 AM and from 8:00 PM to 12:00 AM and divide the remaining portions of the day into one hour time blocks. Likewise, the demand system 240 of a battery kiosk 210 located on Golden Gate Avenue in San Francisco may determine, based on historical usage data, to divide a particular day into equal four hour time blocks.

The demand system 240 may also determine, based on historical usage data and/or peak demand characteristics of light electric vehicles of the battery kiosk 210, that users swap more batteries at a battery kiosk 210 on one particular day versus another. For example, a battery kiosk 210 located on 8th Street and Market Street in San Francisco may be used to swap rechargeable batteries more frequently during the work week (e.g., Monday through Friday) than on the weekend. As such, the demand system 240 may divide time blocks for Monday through Friday one way (e.g., into two hour time blocks) and divide time blocks for Saturday and Sunday a second way (e.g., into four hour time blocks).

The demand system 240 may receive or otherwise determine peak demand characteristics associated with one or more light electric vehicles. The peak demand characteristics may include information about the current and/or anticipated light electric vehicle usage information for an area associated with a battery kiosk 210, current battery charge information for a rechargeable battery used by a light electric vehicle, and/or other rechargeable battery usage information at various times of the day and/or in particular geographic areas. In some examples, the demand system can use the peak demand characteristics to determine a charging rate for one or more rechargeable batteries in the battery kiosk 210.

The demand system 240, via the processing unit 250, may also send, receive and/or request information about a charging status of each rechargeable battery in the battery kiosk 210 from a charging system 230. This information may be received or requested by the demand system 240 at certain predetermined time intervals (e.g., every minute, every five minutes, every hour etc.). In other cases, this information may be received or requested by the demand system 240 in response to an event. The event may be a check-in event, such as, for example, a user checking in a battery at the battery kiosk 210 using the check-in system 260. The event may also be triggered when battery status information 290 is received from a computing device 280, light electric vehicle 235 and/or the network service 275. In yet another example, the event can be triggered by request (e.g., an exchange request received by the computing device 280) for one of the rechargeable batteries housed in the battery kiosk 210. In other examples, the charging status information 291 may be determined or provided by the network service 275. Although specific events are mentioned, these are for example purposes only and other events can trigger the request and/or receipt of the charging status information 291.

In some examples, the charging status information 291 includes: 1) an amount of available charge/power in each rechargeable battery (e.g., whether the rechargeable battery is fully charged and/or to what percentage the rechargeable battery has been charged); 2) information about the current charging rate of each rechargeable battery; and 3) an anticipated amount of time until the rechargeable battery is fully charged (or substantially fully charged) given the charging profile (e.g., current charging rate of each rechargeable battery in the battery kiosk 210) of the charging system 230.

Using the charging status information, in conjunction with historical usage data of the battery kiosk 210, the demand system 240 can determine whether the battery kiosk 210 can meet anticipated demand for an upcoming time block. If the demand system 240 determines that the battery kiosk 210 will not be able to meet the anticipated demand for rechargeable batteries, the demand system 240 will instruct the charging system 230, via the processing unit 250, to alter its charging profile by changing the charging rate of one or more rechargeable batteries.

For example, the demand system 240 of the battery kiosk 210 on 10th Street and Market Street may determine, based on charging status information received from the charging system 230, that the battery kiosk 210 currently has eight rechargeable batteries. Of the eight rechargeable batteries, four are fully charged, two are 80% charged and two are 50% charged. Additionally, historical usage data, stored by the demand system 240 of the battery kiosk 210 on Market Street (or received by the network service 275), indicates that on average, two rechargeable batteries are swapped each hour between the hours of 6:00 AM and 10:00 AM.

Using the charging status information and the historical usage data, the demand system 240 may determine that anticipated demand for rechargeable batteries at the battery kiosk 210 between the hours of 6:00 AM and 8:00 AM will most likely be met because the battery kiosk 210 currently has four fully charged batteries. The demand system 240 may then receive information about the current charging rate of the remaining four batteries in the battery kiosk 210 (e.g., the two batteries that are 80% charged and the two batteries that are 50% charged).

Using the current charging profile of the battery kiosk 210, the demand system 240 may determine that the two rechargeable batteries that are charged at 80% will be fully charged (or substantially fully charged) by 8:00 AM if the current charging rate of those rechargeable batteries remains as is. Thus, the anticipated demand for rechargeable batteries at the battery kiosk 210 on 10th Street and Market Street will most likely be met during the time block between 8:00 AM and 9:00 AM. The demand system 240 may also determine that the two rechargeable batteries that are charged at 50% will not be fully charged by 9:00 AM if the current charging rate of those rechargeable batteries remains as is.

As such, the demand system 240 may determine a new charging rate for those particular rechargeable batteries in order to ensure that they are fully charged (or substantially fully charged) by 9:00 AM. Once the new charging rate is determined by the demand system 240, the demand system 240 may instruct the charging system 230, via the processing unit 250, to increase the charging rate of those two rechargeable batteries by supplying more current to those two rechargeable batteries.

In some examples, the demand system 240 may also use the charging status information to determine when one or more rechargeable batteries should be charged in order to meet the anticipated demand. For example, if the demand system 240 determines that the battery kiosk 210 will most likely need four fully charged rechargeable batteries at 9:00 AM and it will take 3 hours to fully charge these four batteries at a current charging profile (or at a higher charging profile), the demand system 240 (or the network service 275), via the processing unit 250, will instruct the charging system 230 to begin charging (or increase the charging rate) of those batteries at 6:00 AM.

The demand system 240 can use other information about each rechargeable battery when intelligently and dynamically determining the charging rate for each rechargeable battery. For example, the demand system 240 may receive charge cycle information about each battery. Using this information, the demand system 240 can determine that a rechargeable battery with fewer charge cycles will charge faster at a higher charging rate when compared with a rechargeable battery with more charge cycles. As such, the demand system 240 may dynamically increase the charging rate of the rechargeable battery with fewer charge cycles.

The demand system 240 of the battery kiosk 210 may also receive current rechargeable battery usage information (shown as battery status information 290) in a geographic area or geographic region associated with the battery kiosk 210. For example, the battery kiosk 210 may be communicatively coupled to a computing device 280 and/or the network service 275 over a network 270. Although a single computing device 280 is shown, the battery kiosk 210 may communicate with any number of computing devices over the network 270. The network 270 may be a cellular network, a Wi-Fi network or other such communication channel that enables the computing device 280 (e.g., a mobile phone, laptop computer, tablet computer smart watch, video game console, desktop computer and the like) and/or the network service 275 to send information to and receive information from the battery kiosk 210.

Battery status information 290 includes information about one or more rechargeable batteries that are currently in use by, or otherwise coupled to, various light electric vehicles 235. The battery status information 290 may include a current charge status of the rechargeable battery (e.g., a percentage or other amount of charge/power remaining in the rechargeable battery), a rate (e.g., a current rate, an average rate and/or an anticipated rate) at which power in the rechargeable battery is being/will be consumed by the light electric vehicle, an anticipated amount of time before the rechargeable battery will need to be recharged or otherwise returned to the battery kiosk 210, a number of times the rechargeable battery has been charged (e.g., the number of charge cycles of the rechargeable battery) and so on.

In some examples, the battery status information 290 is periodically transmitted (e.g., every five minutes, every ten minutes, etc.) to the battery kiosk 210. The periodic transmission time can be altered based on a time of day. For example, the battery status information 290 can be transmitted to the battery kiosk 210 more frequently during the hours of 6:00 AM to 9:00 AM and from 4:00 PM to 7:00 PM when compared with other hours of the day.

In other implementations, the battery status information 290 can be transmitted to the battery kiosk 210 in response to certain events. These events include: a charge level of a particular rechargeable battery coupled to a light electric vehicle 235 has dropped below one or more battery charge thresholds (e.g., a 50% charge threshold, a 40% charge threshold, etc.); an indication that a user has started using a particular light electric vehicle 235 in a geographic area associated with a particular battery kiosk 210; an indication that a light electric vehicle 235 has entered a geographic area associated with a particular battery kiosk 210, during a rechargeable battery check-in event and so on.

As the battery status information 290 is transmitted to the battery kiosk 210, the demand system 240 uses the battery status information 290, along with the charging status information (e.g., an amount of available charge/power in each rechargeable battery in the battery kiosk 210; information about the current charging rate of each rechargeable battery; an anticipated amount of time until the rechargeable battery is fully charged (or substantially fully charged) given the current charging profile of the battery kiosk 210) of each rechargeable battery to determine whether to dynamically alter the charging rate of one or more of the rechargeable batteries in the battery kiosk 210. In some examples, the demand system 240 may also use historical usage data of the battery kiosk 210, in combination with the battery status information 290 and the charging status information when determining whether to dynamically change the charging rate of one or more rechargeable batteries such as described above.

The demand system 240 may also dynamically alter a charging rate of one or more of the rechargeable batteries in the battery kiosk 210 in response to one or more received requests (shown as swap request 295). For example, a user can initiate the transmission of the swap request 295 by accessing an application executing on the computing device 280 and indicating (e.g., by providing input) that she is planning on exchanging her current rechargeable battery for a different rechargeable battery at the battery kiosk 210.

Once the swap request 295 is received, the demand system 240 can dynamically determine whether to alter its charging profile by changing the charging rate of one or more rechargeable batteries such as described above. In some examples, the swap request 295 may include the requesting user's current location and/or an estimated arrival time at the battery kiosk 210. The estimated arrival time may be calculated using a number of additional factors including current traffic information in a geographic area associated with the user's location and/or the location of the battery kiosk, type of light electric vehicle being used, anticipated or actual speed of the user, weather conditions, time of day, etc.

For example, the swap request 295 may include information that indicates the requesting user is approximately two miles away from the battery kiosk 210 and that the user is riding an electric scooter (e.g., electric scooter 110). The demand system 240 may determine from this information that the user will arrive at the battery kiosk 210 in approximately twenty minutes. Using the information in the swap request 295, as well as charging status information for each of the rechargeable batteries in battery kiosk 210, the demand system 240 may determine whether to increase the charging rate of one or more of the rechargeable batteries in the battery kiosk 210. As with the other examples described herein, the swap request 295 may be combined with one or more of the historical usage data and/or the battery status information 290 when determining whether to dynamically alter the charging rate of one or more rechargeable batteries.

In some examples, when the swap request 295 is received, the demand system 240 determines whether the battery kiosk 210 will have a fully charged (or substantially fully charged) rechargeable battery for the requesting user. If so, the demand system 240 (or the network service 275) may provide directions 297 to the battery kiosk 210, over the network 270, to the computing device 280 of the requesting user. However, if the demand system 240 determines that it will not have a rechargeable battery available to the requesting user, the demand system 240 and/or the network service 275 may communicate (e.g., over the network 270) with demand systems of other battery kiosks and/or the network service 275, to determine if one of the other battery kiosks has an available rechargeable battery for the requesting user. If so, directions 297 to that other battery kiosk may be provided to the computing device 280.

In another implementation, if the demand system 240 determines that a rechargeable battery will not be available when the user arrives at the battery kiosk 210, the demand system 240 may include an anticipated wait time for the rechargeable battery along with the directions 297. For example, the demand system 240 may determine that based on: the current charge level of each battery in the battery kiosk 210, the current charging rate of each rechargeable battery in the battery kiosk 210, and an estimated arrival time of the user at the battery kiosk 210, the user may be required to wait a determined amount of time (e.g., ten minutes) until a rechargeable battery is fully charged (or has been charged above a determined threshold, such as, for example, 50% or more, 60% or more and so on). In other implementations, the battery kiosk 210 will provide the requesting user the rechargeable battery with the most amount of charge/power regardless of whether the rechargeable battery is fully charged or is charged above a desired threshold.

When the requesting user arrives at the battery kiosk 210, the check-in system 260 of the battery kiosk 210 may be used to receive the old rechargeable battery and provide the user with a different rechargeable battery such as described above.

Although the examples described above discuss dynamically increasing the charging rate of one or more rechargeable batteries, the demand system 240 may also determine that a charging rate of one or more rechargeable batteries can be decreased. For example, if the demand system 240 determines that it has sufficient rechargeable batteries to meet demand specified by the anticipated usage data of the battery kiosk 210, the demand system 240 may instruct the charging system 230 to decrease a charging rate for one or more batteries and/or stop charging one or more of the rechargeable batteries in the battery kiosk 210.

Although FIG. 2 shows the charging control system 215, and more specifically, each of the demand system 240, the check-in system 260, and the charging system 230 as part of the battery kiosk 210, one or more of these systems, including the charging control system 215, may be included or otherwise implemented in the network service 275. In such implementations, the battery kiosk 210 may receive charging profile information from the network service 275.

Figure 3:
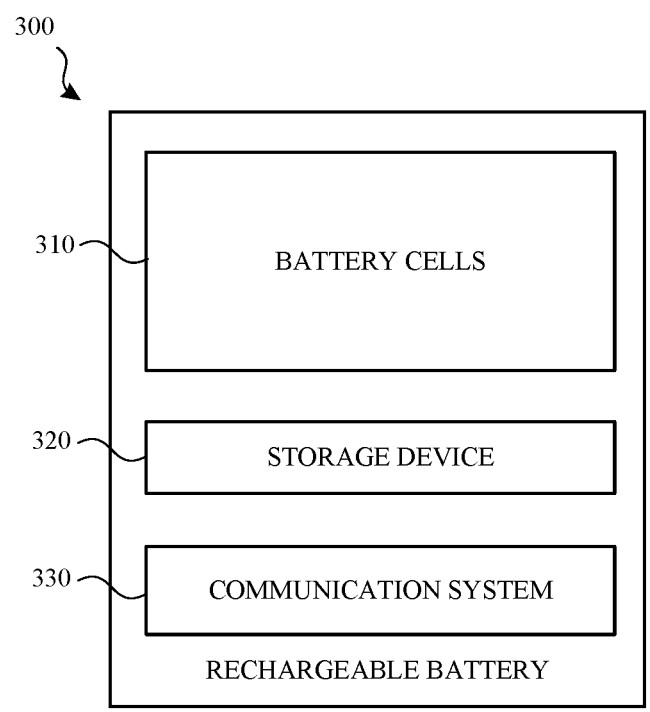
FIG. 3 is a system diagram of a rechargeable battery according to one or more examples.

FIG. 3 is a system diagram of a rechargeable battery 300 according to one or more examples. In some examples, the rechargeable battery 300 corresponds to the rechargeable battery 160 shown and described herein.

According to examples, the rechargeable battery 300 includes a plurality of battery cells 310. The battery cells 310 are structured to receive power (and store charge) via a charging operation such as, for example, when the rechargeable battery is placed in and receives current from a rechargeable battery kiosk (e.g., rechargeable battery kiosk 150 (FIG. 1)). The battery cells 310 of the rechargeable battery 300 are also configured to provide power, e.g., by discharging and providing current, to a light electric vehicle (e.g., the electric scooter 110 and/or the electric bicycle 130 (FIG. 1)).

The rechargeable battery 300 may store, in a storage or memory device 320, charging status information and/or other information about the rechargeable battery 300 (e.g., battery identifier, model number, etc.). The charging status information may include information about an amount of available charge/power in the rechargeable battery 300 and/or an indication of the number of times the rechargeable battery 300 has been charged (referred to herein as charge cycles).

As described herein, the battery kiosk can dynamically alter a charging rate of a rechargeable battery 300 in order to ensure, or at least increase a probability that the rechargeable battery demand or usage at that particular battery kiosk will be met. In some examples, rechargeable batteries with fewer charge cycles may charge faster than those with higher charge cycles. Thus, when the rechargeable battery 300 is checked in to a battery kiosk such as described above, the rechargeable battery 300 may provide its charge cycle information to the battery kiosk. Using this information, the battery kiosk can intelligently select which rechargeable batteries can be charged more effectively at a higher charging rate.

The rechargeable battery 300 may also include a communication system 330. In some examples, the communication system is a near field communication (NFC) system, a Bluetooth system, Wi-Fi system, a cellular communication system, and/or other such communication system that enables the rechargeable battery 300 to communicate or exchange data with another device (e.g., communicate current charge information and/or charge cycle information to a battery kiosk, to the network service, and/or to a computing device of a user). In some examples, the communication system 330 transmits the current charge information and/or the charge cycle information to a computing device (e.g., computing device 280 (FIG. 2)). The computing device 280 may then transmit this information to the battery kiosk 210 and/or a network service 275 as part of the battery status information 290 and/or the swap request 295 (see FIG. 2).

Figure 4:
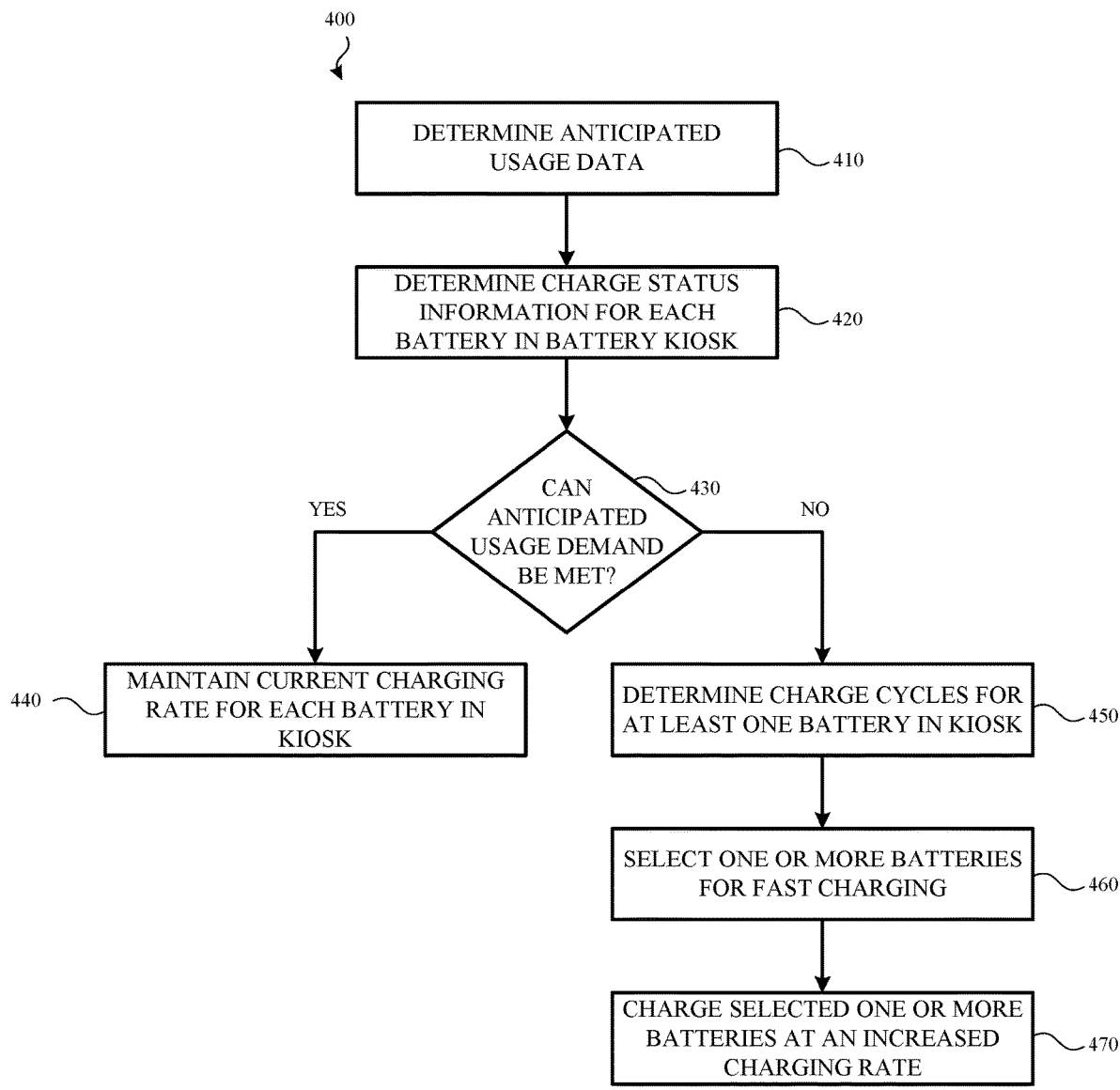
FIG. 4 illustrates a method for dynamically altering a charging rate of one or more rechargeable batteries according to one or more examples.

FIG. 4 illustrates a method 400 for dynamically altering a charging rate of one or more rechargeable batteries housed by a battery kiosk, according to one or more examples. The method 400 shown and described with respect to FIG. 4 may be used by the charging control system 215 (or one or more systems of the charging control system 215) of the battery kiosk 210 (FIG. 2).

The battery kiosk can determine anticipated usage data for the battery kiosk (410). As an addition or an alternative, the battery kiosk can receive the anticipated usage data from a network service. In some examples, the anticipated usage data is based, at least in part, on one or more of historical usage data of rechargeable batteries at the battery kiosk, current rechargeable battery usage information in an area associated with the battery kiosk and/or received requests for one or more of a plurality of rechargeable batteries housed in the battery kiosk. For example, the battery kiosk and/or the network service can store historical information about which battery kiosks are used by users over a given instance or duration of time, can receive and/or store information about vehicles or rechargeable batteries that are in a given area(s) associated with individual battery kiosks, and/or can receive and/or store information from individual battery kiosks when rechargeable batteries are exchanged by users.

As described above, the historical usage data may include information about how many times, during a particular day or during particular time blocks within the particular day, rechargeable batteries are exchanged at a particular battery kiosk. Current rechargeable battery usage information includes information that is received, by the battery kiosk from one or more rechargeable batteries that are currently in use by, or otherwise coupled to, various light electric vehicles. For example, the current rechargeable battery usage information may include a current charge status of the rechargeable battery, a current rate at which power in the rechargeable battery is being consumed by the light electric vehicle, an anticipated amount of time before the rechargeable battery will need to be recharged or otherwise returned to the battery kiosk, a number of times the battery has been charged and so on.

Anticipated usage data for the battery kiosk may also be based, at least in part, in response to one or more received exchange requests (e.g., swap request 295 (FIG. 2)). For example, a user may initiate the exchange request by accessing an application on a computing device and indicate she is planning on exchanging her current rechargeable battery for a different rechargeable battery at the battery kiosk.

Once one or more items of information described above is received (from a computing device and/or a network service) or otherwise determined by the battery kiosk, the battery kiosk determines charge status information for each rechargeable battery in the battery kiosk (420). In some examples, the charge status information includes an amount of available charge/power in each rechargeable battery; information about a current charging profile of the battery kiosk (e.g., the current charging rate of each rechargeable battery); and an anticipated amount of time until the rechargeable battery is fully charged (or substantially fully charged) given the current charging profile.

The battery kiosk (and/or the network service) can determine whether the battery kiosk can or will meet demand indicated by the anticipated usage data (430). For example, based on one or more of: 1) the historical usage data, 2) the current rechargeable battery usage information, and/or 3) the received requests, in conjunction with the charge status information, the battery kiosk determines whether the battery kiosk will have an ample supply of fully charged (or substantially fully charged) rechargeable batteries to meet the anticipated usage demand.

If it is determined that the anticipated usage demand can be met, the battery kiosk maintains (or is instructed to maintain) the current charging profile of the battery kiosk (440). For example, the battery kiosk may currently house eight rechargeable batteries. Four of the eight rechargeable batteries may be fully charged (or substantially fully charged) while the remaining four batteries are charged at 50%. Execution of operation 410 and operation 420 may indicate that it is anticipated that the battery kiosk will need four fully charged (or substantially fully charged) rechargeable batteries in the next four hours.

Additionally, execution of operation 410 and operation 420 may indicate that it is anticipated that the battery kiosk will need two more fully charged (or substantially fully charged) rechargeable batteries in the following four hours. Thus, the battery kiosk will need a total of six fully charged rechargeable batteries in the next 8 hours. However, given that the battery kiosk already houses four fully charged rechargeable batteries, the battery kiosk may determine that the anticipated demand for the first four hours is already met. Additionally, the battery kiosk may determine that at least two of the remaining four batteries will be fully charged within the next four hours given the current charging profile. Thus, the anticipated demand for the following four hours will also be met. As such, operation 440 provides that the charging rate for each battery in the battery kiosk is maintained.

However, if it is determined that the demand indicated by anticipated usage data cannot be met, the battery kiosk (and/or the network service) dynamically and intelligently alters its charging profile by changing the charging rate of one or more rechargeable batteries. For example, the battery kiosk may currently house eight rechargeable batteries. Four of the eight rechargeable batteries may be fully charged (or substantially fully charged) while the remaining four batteries are charged at 50%. Execution of operation 410 and operation 420 may indicate that it is anticipated that the battery kiosk will need six fully charged (or substantially fully charged) rechargeable batteries in the next four hours.

Additionally, execution of operation 410 and operation 420 may indicate that it is anticipated that the battery kiosk will need two more fully charged (or substantially fully charged) rechargeable batteries in the following two hours (e.g., a total of eight fully charged rechargeable batteries in the next six hours). Although the battery kiosk already houses four fully charged rechargeable batteries, the battery kiosk can determine which of the four remaining rechargeable batteries should be charged at a faster rate, how long it will take to fully charge (or substantially fully charge) one or more of the remaining four rechargeable batteries and when the increased charging rate should be applied to one or more of the remaining four rechargeable batteries.

As discussed herein, in some cases, a rechargeable battery with fewer charge cycles may be more quickly charged when compared with a rechargeable battery with more charge cycles. As such, in one example, the battery kiosk (and/or the network service) can determine the charging cycles of at least one rechargeable battery in the battery kiosk (450).

Continuing with the example above, in operation 450, the number of charging cycles of each of the remaining four rechargeable batteries is determined. In this example, a first rechargeable battery has 100 charging cycles, a second rechargeable battery has 200 charging cycles, a third rechargeable battery has 250 charging cycles and a fourth rechargeable battery has 350 charging cycles. Using the charging cycle information, along with the current charge information for each battery, the battery kiosk can determine how long it will take to fully charge (or substantially fully charge) each of the remaining four rechargeable battery.

In some examples, this time determination may be altered based on a selected or determined charging rate. For example, the battery kiosk may determine that it will take forty minutes to fully charge the first rechargeable battery at a first increased charging rate and it will take one hour to fully charge the first rechargeable battery at a second increased charging rate. Likewise, it will take forty-five minutes to fully charge the second rechargeable battery at the first increased charging rate and it will take one hour and five minutes to fully charge the second rechargeable battery at the second increased charging rate. The battery kiosk may also determine that it will take an hour and a half to fully charge the third and fourth rechargeable batteries at the first increased charging rate and it will take an hour and forty-five minutes to fully charge the third and fourth rechargeable batteries at the second increased charging rate.

Once the charging cycles have been determined, the battery kiosk (and/or the network service) can select at least one of the rechargeable batteries for faster charging that one or more other rechargeable batteries (460). In some examples, selection of one of the rechargeable batteries also includes a selection of a charging rate for that rechargeable battery. In another example, the battery kiosk (and/or the network service) can also select one or more other rechargeable batteries to be charged at a slower rate than the selected rechargeable battery for faster charging.

Continuing with the example above, if it is anticipated that the battery kiosk will need a fifth fully charged (or substantially fully charged) rechargeable battery in fifty minutes, operation 460 provides that the battery kiosk will select the first rechargeable battery for fast charging and that the first rechargeable battery will need to be charged at the first charging rate. Thus, the first rechargeable battery should be fully charged in forty minutes. Likewise, if it is anticipated that the battery kiosk will need a fifth and sixth fully charged rechargeable batteries in in the next hour and ten minutes, the battery kiosk may select the first and second rechargeable batteries and charge them at the second increased charging rate.

The battery kiosk can charge the selected one or more rechargeable batteries at the increased charging rate (470). That is, a charging system of the battery kiosk will supply a determined amount of current to the selected one or more rechargeable batteries in order to charge the rechargeable battery at the new charging rate.

In some examples, the rechargeable battery that is initially selected for fast charging in operation 460 may be replaced by a different rechargeable battery. For example, a user may initiate a battery check-in process at the battery kiosk. As part of the check-in process, the battery kiosk may determine that the newly received battery has fewer charging cycles and/or more remaining power than the rechargeable battery that was initially selected for fast charging. As such, the battery kiosk may reduce the charging rate of the selected rechargeable battery and increase the charging rate of the newly received rechargeable battery. In another example, the battery kiosk may continue to fast charge the selected rechargeable battery while also fast charging the newly received battery—at either the same fast charging rate or a different fast charging rate, depending on anticipated demand.

In another example, the rechargeable battery that is initially selected for fast charging may be removed from the battery kiosk by a requesting user. For example, a user may initiate a check-in process at the battery kiosk in order to check-in a depleted (or mostly depleted) rechargeable battery. The rechargeable battery that is currently being fast charged by the battery kiosk may have the highest charge percentage. As such, the user may be directed, by the battery kiosk, to take that rechargeable battery. In such examples, the battery kiosk may determine a new charging profile and charge one or more rechargeable batteries at a newly calculated charging rate based on, for example an anticipated demand.

Figure 5:
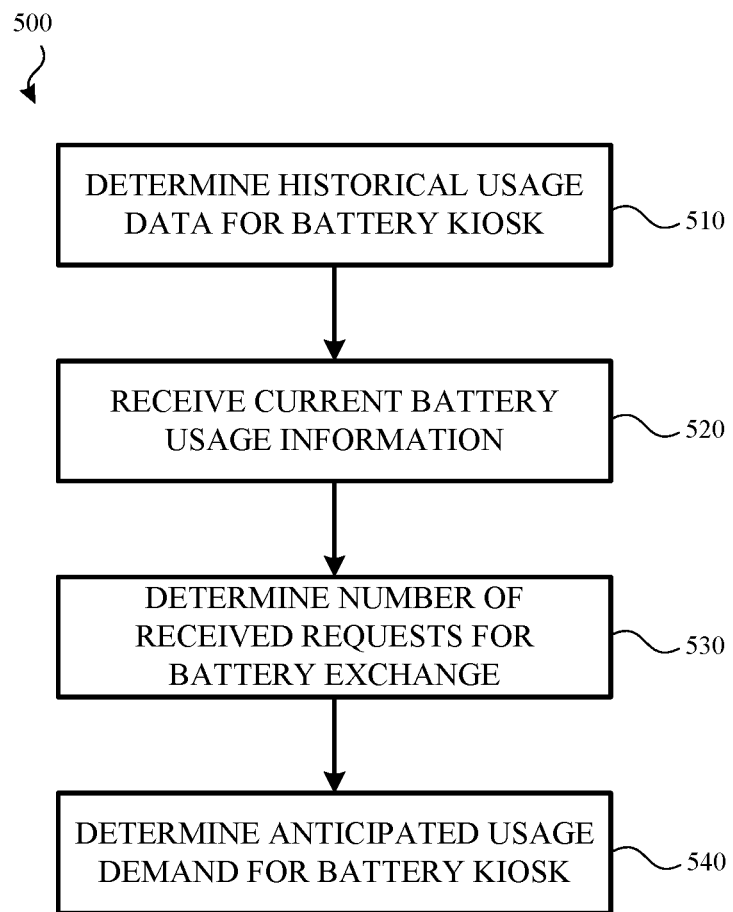
FIG. 5 illustrates a method for determining anticipated demand for rechargeable batteries at a rechargeable battery kiosk according to one or more examples.

FIG. 5 illustrates a method 500 for determining anticipated usage data for a battery kiosk, according to one or more examples. While the example of FIG. 5 is described as being performed by the network service, depending on other implementations, the example method of FIG. 5 can be performed by a battery kiosk, by a user's computing device, and/or multiple systems (e.g., the battery kiosk and the network service). For example, in some implementations, one or more operations of the method of FIG. 5 can be used in operation 410 of the method of FIG. 4.

According to an example, the network service can determine historical usage data for a particular battery kiosk over a given duration of time (510). As described above, the historical usage data of the particular battery kiosk may include information about how many times, during a particular time block or time blocks, within a determined period of time (e.g., a day) the battery kiosk is used to exchange rechargeable batteries. The historical usage data includes the number of times a battery check-in request has been initiated by a user, either at the battery kiosk itself or through an application executing on a computing device.

When historical usage information is determined, the network service can receive and/or determine current battery usage information (520). In some examples, the battery usage information is limited to rechargeable batteries that are determined to be in a geographic area associated with the battery kiosk. As discussed above, the battery usage information may be communicated from a computing device and/or a network service to the battery kiosk over a communication channel such, as for example, a cellular network. The information may include a current charge status of the rechargeable battery, a rate at which power in the rechargeable battery is being/will be consumed by an light electric vehicle, an anticipated amount of time before the rechargeable battery will need to be recharged or otherwise returned to the battery kiosk, and a number of times the battery has been charged (e.g., the charge cycles of the rechargeable battery).

In one example, the network service can receive and/or determine a number of received requests for a battery exchange for the battery kiosk (530). In some examples, the request for the battery exchange can be initiated by a user using an application on the computing device. For example, the user can provide input in the application that indicates she is planning on exchanging her current rechargeable battery for a different rechargeable battery at the battery kiosk. Once the request is received, the user may be provided with directions or other information about the location of the battery kiosk.

The network service can then determine the battery kiosk's anticipated usage demand (540). In some instances, the anticipated usage demand is determined for a set period of time. For example, the set period of time may be two hour increments, four hour increments, eight hour increments and so on.

In some examples, operation 540 may determine anticipated usage demand using any combination of operations 510-530. For example, the anticipated usage demand can be determined using operation 510 only, operation 510 and operation 520 only, operation 510 and operation 530 only, operation 520 only and so on.

Figure 6:
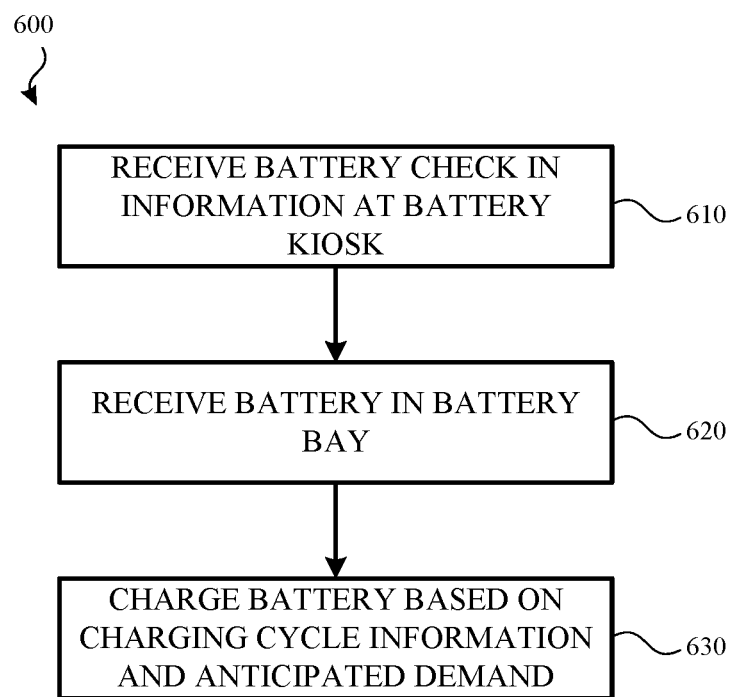
FIG. 6 illustrates a method for determining charging cycle information for a rechargeable battery according to one or more examples.

FIG. 6 illustrates a method 600 for determining charging cycle information for a rechargeable battery, according to one or more examples. Method 600 may be used by a charging control system of a battery kiosk, such as, for example, the charging control system 215 of the battery kiosk 210 (FIG. 2).

According to some examples, the battery kiosk can receive check-in information for a rechargeable battery (610). The check-in information may be received directly from the rechargeable battery (e.g., using the battery communication system such as, for example, battery communication system 330 (FIG. 3)). In another example, the check-in information may be received as part of an exchange request (e.g., swap request 295 (FIG. 2)) received by the battery kiosk and/or other information provided by a network service.

The check-in information includes information about an amount of charge remaining in the rechargeable battery, the charging cycles of the rechargeable battery, the overall health of battery cells within the rechargeable battery and/or other identifying characteristics about the rechargeable battery such as, for example a unique identifier.

The rechargeable battery is received into a battery bay of the battery kiosk (620). Once received, the battery kiosk may store the charge cycle information and/or the charge information of the rechargeable battery and associate that information with the battery bay. Thus, when the battery kiosk determines/selects which battery it will dynamically alter the charging rate for, the charge cycle information and power information is readily obtainable. In some examples, the battery kiosk may communicate the charge information of the rechargeable battery to a network service. Once received, the network service may store this information and/or transmit this information to other battery kiosks and/or light electric vehicles when, for example, that rechargeable battery is subsequently checked in at the other battery kiosk and/or used by the light electric vehicle.

The battery kiosk charges a selected rechargeable battery at a determined charging rate (630). For example, the battery may be charged at a first rate if it is determined that the battery kiosk will meet anticipated demand. However, the rechargeable battery may be charged at a second, faster rate, if it is determined that the battery kiosk will not meet anticipated demand such as described herein.

While the example of FIG. 6 is described as being performed by the battery kiosk, in other implementations, battery charging instructions and/or control may be performed by another system. For example, the network service may receive or otherwise determine anticipated demand for rechargeable batteries at the battery kiosk.

Once this information is received and/or determined, the network service may instruct the battery kiosk to fast charge certain rechargeable batteries. For example, the network service may provide instructions to the battery kiosk to fast charge the rechargeable battery in battery bay 1 and fast charge the rechargeable battery in battery bay 3. In addition, the network service may also instruct the battery kiosk about the charging rate for the rechargeable batteries that will be fast charged and/or a time at which the battery kiosk is to start charging the batteries at the faster rate.

Figure 7:
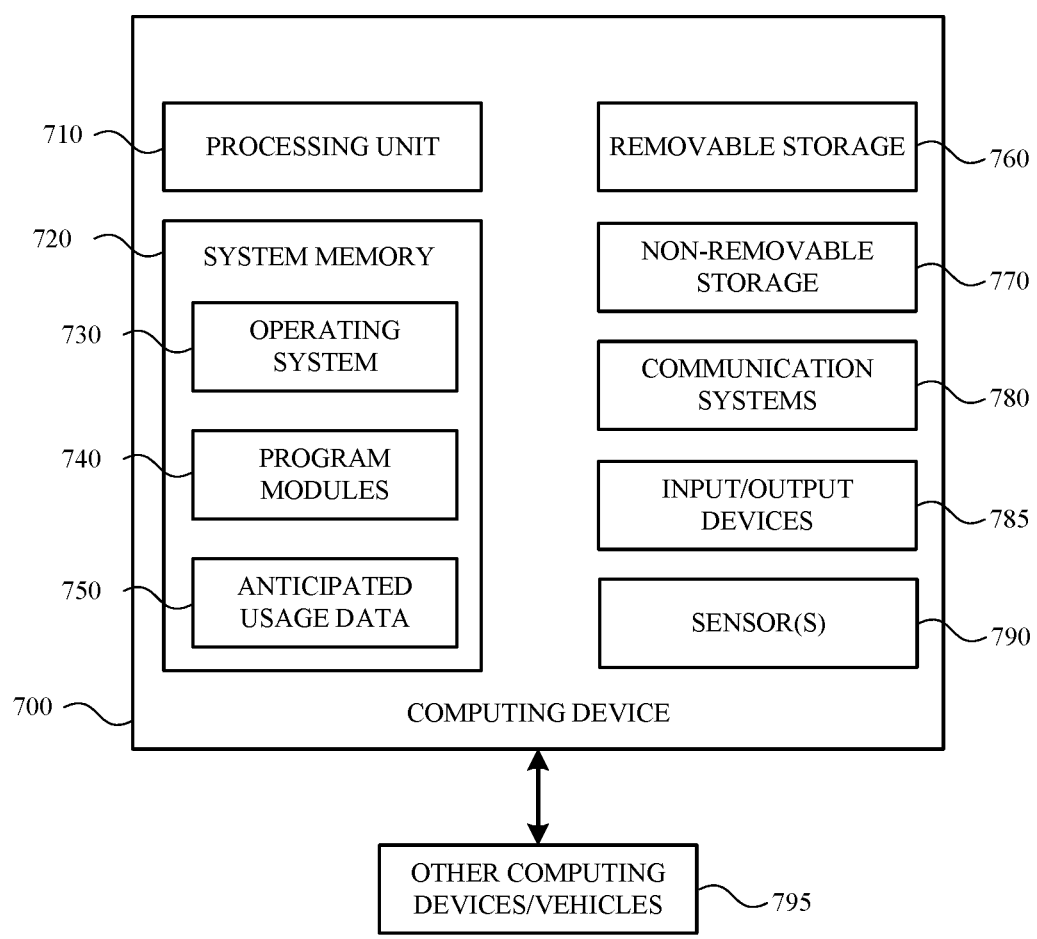
FIG. 7 is a system diagram of a computing device that may be integrated with or utilized by the rechargeable battery kiosk and/or various other systems described herein.

FIG. 7 is a system diagram of a computing device 700 according to an example. The computing device 700 may be integrated with or associated with a light electric vehicle, such as the electric scooter(s) 110 and/or the electric bicycle(s) 130 shown and described with respect to FIG. 1. A computing device 700 may also be associated or otherwise integrated with the battery kiosk 210 and the rechargeable battery kiosk(s) 150. Additionally, a computing device 700 may be integrated or otherwise associated with various systems shown and described with respect to FIG. 1-FIG. 2. As shown in FIG. 7, the physical components (e.g., hardware) of the computing are illustrated and these physical components may be used to practice the various aspects of the present disclosure.

The computing device 700 may include at least one processing unit 710 and a system memory 720 or memory resource. The system memory 720 or memory resource may include, but is not limited to, volatile storage (e.g., random access memory), non-volatile storage (e.g., read-only memory), flash memory, or any combination of such memories. The system memory 720 may also include an operating system 730 that control the operation of the computing device 700 and one or more program modules 740. The program modules 740 may be responsible for gathering, receiving and/or determining anticipated usage data 750 and/or charging rates for one or more rechargeable batteries such as described above. The system memory 720 may also store this information or otherwise provide access to this information. A number of different program modules and data files may be stored in the system memory 720. While executing on the processing unit 710, the program modules 740 may perform the various operations described above.

The computing device 700 may also have additional features or functionality. For example, the computing device 700 may include additional data storage devices (e.g., removable and/or non-removable storage devices) such as, for example, magnetic disks, optical disks, or tape. These additional storage devices are labeled as a removable storage 760 and a non-removable storage 770.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 700 on the single integrated circuit (chip). The disclosure may also be practiced using other technologies capable of performing logical operations such as, for example, AND, OR, and NOT, including but not limited to mechanical, optical, fluidic, and quantum technologies. In addition, examples of the disclosure may be practiced using a computing device associated with or integrated with the electric vehicle and/or in any other circuits or systems.

The computing device 700 may include one or more communication systems 780 that enable the light electric vehicles to communicate with rechargeable batteries, rechargeable battery kiosks, other light electric vehicles, other computing devices 795, a network service and the like. Examples of communication systems 780 include, but are not limited to, radio frequency (RF) transmitter, receiver, and/or transceiver circuitry, a Controller Area Network (CAN) bus, a universal serial bus (USB), parallel, and/or serial ports.

The computing device 700 may also have one or more input devices and/or one or more output devices shown as input/output devices 785. These input/output devices 785 may include a keyboard, a sound or voice input device, haptic devices, a touch, force and/or swipe input device, a display, speakers, etc. The aforementioned devices are examples and others may be used.

The computing device 700 may also include one or more sensors 790. The sensors may be used to detect or otherwise provide information about the operating condition of the light electric vehicle, a rechargeable battery and/or a rechargeable battery kiosk. In other examples, the sensors 790 may provide information about a light electric vehicle to which the computing device 700 is associated. For example, the sensors 790 may include a heat sensor, a charge sensor or other such rechargeable battery sensors.

The term computer-readable media as used herein may include computer storage media. Computer storage media may include volatile and nonvolatile, removable and non-removable media implemented in any method or technology for storage of information, such as computer readable instructions, data structures, or program modules.

The system memory 720, the removable storage 760, and the non-removable storage 770 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As described above, examples of the present disclosure describe a method, comprising: receiving, at a rechargeable battery kiosk, anticipated usage data for the rechargeable battery kiosk for a given duration of time, wherein the anticipated usage data is based, at least in part, on one or more of: historical usage data of rechargeable batteries at the rechargeable battery kiosk; current rechargeable battery usage information in an area associated with the rechargeable battery kiosk; or requests for one or more of a plurality of rechargeable batteries housed in the rechargeable battery kiosk; in response to receiving the anticipated usage data, selecting, by the rechargeable battery kiosk, a rechargeable battery from the plurality of rechargeable batteries; and charging the selected rechargeable battery at a first charging rate while charging at least one of the plurality of rechargeable batteries at a second charging rate that is different from the first charging rate. In some examples, the first charging rate is faster than the second charging rate. In some examples, the method also includes determining, based, at least in part, on information provided by each of the plurality of rechargeable batteries, a number of charging cycles of each rechargeable battery in the plurality of rechargeable batteries. In some examples, the selected rechargeable battery has fewer charging cycles when compared with the charging cycles of each of the other rechargeable batteries in the plurality of rechargeable batteries. In some examples, the method also includes determining, based, at least in part, on information provided by each of the plurality of rechargeable batteries, a charge level for each rechargeable battery in the plurality of rechargeable batteries. In some examples, selecting the rechargeable battery from the plurality of rechargeable batteries is based, at least in part, the charge levels of the plurality of rechargeable batteries. In some examples, the method also includes determining, by the rechargeable battery kiosk, an amount of time required to substantially charge the selected rechargeable battery. In some examples, the method also includes initiating the charging of the selected rechargeable battery at the first charging rate at the amount of time prior to the given duration of time.

In other examples, a charging control system is disclosed. The charging control system, comprising: a processor; and a memory storing instructions that, when executed by the processor, cause the charging control system to: receive anticipated usage data for a rechargeable battery kiosk for a given duration of time, wherein the anticipated usage data is based, at least in part, on one or more of: historical usage data of rechargeable batteries at the rechargeable battery kiosk; current rechargeable battery usage information in an area associated with the rechargeable battery kiosk; or requests for one or more of a plurality of rechargeable batteries housed in the rechargeable battery kiosk; in response to receiving the anticipated usage data, select a rechargeable battery from the plurality of rechargeable batteries; and cause the rechargeable battery kiosk to charge the selected rechargeable battery at a first charging rate while charging at least one of the plurality of rechargeable batteries at a second charging rate that is different from the first charging rate. In some examples, the duration of time is one or more blocks of time during a particular day. In some examples, the instructions include instructions for determining, based, at least in part, on information provided by each of the plurality of rechargeable batteries, a number of charging cycles of each rechargeable battery in the plurality of rechargeable batteries. In some examples, the selected rechargeable battery has fewer charging cycles when compared with the charging cycles of each of the other rechargeable batteries in the plurality of rechargeable batteries. In some examples, the instructions include instructions for determining, based, at least in part, on information provided by each of the plurality of rechargeable batteries, a charge level for each rechargeable battery in the plurality of rechargeable batteries. In some examples, selecting the rechargeable battery from the plurality of rechargeable batteries is based, at least in part, the charge levels of the plurality of rechargeable batteries. In some examples, the instructions include instructions for determining an amount of time required to substantially charge the selected rechargeable battery. In some examples, the instructions include instructions for initiating the charging of the selected rechargeable battery at the first charging rate at the amount of time prior to the given duration of time.

Also described is a rechargeable battery kiosk. In some examples, the rechargeable battery kiosk comprises: one or more processors; and one or more memory resources, coupled to the one or more processors, storing instructions that, when executed by the one or more processors, cause the rechargeable battery kiosk to: receive a request for a rechargeable battery exchange; in response to the request, receive, in a first battery bay, a first rechargeable battery; receive, anticipated usage data for the rechargeable battery kiosk, wherein the anticipated usage data is based, at least in part, on one or more of: historical usage data of rechargeable batteries at the rechargeable battery kiosk; current rechargeable battery usage information in an area associated with the rechargeable battery kiosk; or requests for one or more of a plurality of rechargeable batteries housed in the rechargeable battery kiosk; in response to receiving the anticipated usage data, charge the first rechargeable battery at a first charging rate while charging at least one of the plurality of rechargeable batteries at a second charging rate that is different from the first charging rate; and release a second rechargeable battery from a second battery bay. In some examples, the anticipated usage data is associated with a particular duration of time. In some examples, the instructions include instructions for determining, based, at least in part, on information provided by each of the plurality of rechargeable batteries, a number of charging cycles of each rechargeable battery in the plurality of rechargeable batteries. In some examples, the selected rechargeable battery has fewer charging cycles when compared with the charging cycles of each of the other rechargeable batteries in the plurality of rechargeable batteries.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
communication with a computing device comprising one or more input devices and one or more output devices;
receiving, at a rechargeable battery kiosk, anticipated usage data for the rechargeable battery kiosk for a given duration of time, wherein the anticipated usage data is based, at least in part, on one or more of:
historical usage data of rechargeable batteries at the rechargeable battery kiosk;
current rechargeable battery usage information in an area associated with the rechargeable battery kiosk; or
requests for one or more of a plurality of rechargeable batteries housed in the rechargeable battery kiosk;
receiving or requesting, from a charging system, charging status of a selected rechargeable battery housed in a rechargeable battery kiosk, wherein the receiving or requesting is based, at least in part, on one or more of a predetermined time interval;
a check-in event including a user checking in the selected rechargeable battery into the rechargeable battery kiosk;
receiving battery status information for the selected rechargeable battery from the computing device; or
receiving a request from the user for a rechargeable battery housed in the battery kiosk;
in response to receiving the anticipated usage data, selecting, by the rechargeable battery kiosk, a rechargeable battery from the plurality of rechargeable batteries, and charging the selected rechargeable battery at a first charging rate while charging at least one of the plurality of rechargeable batteries at a second charging rate that is different from the first charging rate,
in response to receiving or requesting the charging status of the selected rechargeable battery, determining, based, at least in part, on the charging status of each of the plurality of rechargeable batteries, a charge level for each rechargeable battery in the plurality of rechargeable batteries, and sending, when the charging status of the selected rechargeable battery is lower than the anticipated usage data, instructions to initiate an increase in the first charging rate when compared to the second charging rate; and
transmitting a status of the selected rechargeable battery to the computing device.

2. The method of claim 1, wherein the first charging rate is faster than the second charging rate.

3. The method of claim 1, further comprising determining a state of health of each rechargeable battery in the plurality of rechargeable batteries.

4. The method of claim 3, wherein the selected rechargeable battery has fewer charging cycles when compared with the charging cycles of each of the other rechargeable batteries in the plurality of rechargeable batteries.

5. The method of claim 1, further comprising determining, by the rechargeable battery kiosk, an amount of time required to substantially charge the selected rechargeable battery.

6. A charging control system, comprising:
a processor; and
a memory storing instructions that, when executed by the processor, cause the charging control system to:
receive anticipated usage data for a rechargeable battery kiosk for a given duration of time, wherein the anticipated usage data is based, at least in part, on one or more of:
historical usage data of rechargeable batteries at the rechargeable battery kiosk;
current rechargeable battery usage information in an area associated with the rechargeable battery kiosk; or
requests for one or more of a plurality of rechargeable batteries housed in the rechargeable battery kiosk;
receiving or requesting, from a charging system, charging status of a selected rechargeable battery housed in a rechargeable battery kiosk, wherein the receiving or requesting is based, at least in part, on one or more of a predetermined time interval;
a check-in event including a user checking in the selected rechargeable battery into the rechargeable battery kiosk;
receiving battery status information for the selected rechargeable battery from the computing device; or
receiving a request from the user for a rechargeable battery housed in the battery kiosk;
in response to receiving the anticipated usage data, select a rechargeable battery from the plurality of rechargeable batteries, and cause the rechargeable battery kiosk to charge the selected rechargeable battery at a first charging rate while charging at least one of the plurality of rechargeable batteries at a second charging rate that is different from the first charging rate, and
in response to receiving or requesting the charging status of the selected rechargeable battery, determine, based, at least in part, on the charging status of each of the plurality of rechargeable batteries, a charge level for each rechargeable battery in the plurality of rechargeable batteries, and send, when the charging status of the selected rechargeable battery is lower than the anticipated usage data, instructions to initiate an increase in the first charging rate when compared to the second charging rate.

7. The charging control system of claim 6, wherein the duration of time is one or more blocks of time during a particular day.

8. The charging control system of claim 6, further comprising instructions for determining, based, at least in part, on information provided by each of the plurality of rechargeable batteries, a number of charging cycles of each rechargeable battery in the plurality of rechargeable batteries.

9. The charging control system of claim 8, wherein the selected rechargeable battery has fewer charging cycles when compared with the charging cycles of each of the other rechargeable batteries in the plurality of rechargeable batteries.

10. The charging control system of claim 6, wherein selecting the rechargeable battery from the plurality of rechargeable batteries is based, at least in part, the charge levels of the plurality of rechargeable batteries.

11. The charging control system of claim 6, further comprising instructions for determining an amount of time required to substantially charge the selected rechargeable battery.

12. The charging control system of claim 11, further comprising instructions for initiating the charging of the selected rechargeable battery at the first charging rate at the amount of time prior to the given duration of time.

13. A rechargeable battery kiosk, comprising:
one or more processors; and
one or more memory resources, coupled to the one or more processors, storing instructions that, when executed by the one or more processors, cause the rechargeable battery kiosk to:
receive a request for a rechargeable battery exchange;
in response to the request, receiving, in a first battery bay, a first rechargeable battery;
receiving, anticipated usage data for the rechargeable battery kiosk, wherein the anticipated usage data is based, at least in part, on one or more of:
historical usage data of rechargeable batteries at the rechargeable battery kiosk;
current rechargeable battery usage information in an area associated with the rechargeable battery kiosk; or
requests for one or more of a plurality of rechargeable batteries housed in the rechargeable battery kiosk;
receiving or requesting, from a charging system, charging status of a selected rechargeable battery housed in a rechargeable battery kiosk, wherein the receiving or requesting is based, at least in part, on one or more of
a predetermined time interval;
a check-in event including a user checking in the selected rechargeable battery into the rechargeable battery kiosk;
receiving battery status information for the selected rechargeable battery from the computing device; or
receiving a request from the user for a rechargeable battery housed in the battery kiosk
in response to receiving the anticipated usage data, charging the first rechargeable battery at a first charging rate while charging at least one of the plurality of rechargeable batteries at a second charging rate that is different from the first charging rate;
in response to receiving or requesting the charging status of the selected rechargeable battery, determine, based, at least in part, on the charging status of each of the plurality of rechargeable batteries, a charge level for each rechargeable battery in the plurality of rechargeable batteries, and send, when the charging status of the selected rechargeable battery is lower than the anticipated usage data, instructions to initiate an increase in the first charging rate when compared to the second charging rate; and
releasing a second rechargeable battery from a second battery bay.

14. The rechargeable battery kiosk of claim 13, wherein the anticipated usage data is associated with a particular duration of time.

15. The rechargeable battery kiosk of claim 13, further comprising instructions for determining, based, at least in part, on information provided by each of the plurality of rechargeable batteries, a number of charging cycles of each rechargeable battery in the plurality of rechargeable batteries.

16. The rechargeable battery kiosk of claim 15, wherein the selected rechargeable battery has fewer charging cycles when compared with the charging cycles of each of the other rechargeable batteries in the plurality of rechargeable batteries.

* * * * *